June 17, 1969   L. G. STRIGGOW   3,450,975
IMPEDANCE NETWORK FOR CONTROLLED RECTIFIERS
Filed May 23, 1967

INVENTOR
LEWIS G. STRIGGOW

BY

WILSON, SETTLE & BATCHELDER.
ATT'YS.

# United States Patent Office 3,450,975
Patented June 17, 1969

3,450,975
IMPEDANCE NETWORK FOR CONTROLLED RECTIFIERS
Lewis G. Striggow, 1115 Marion Drive,
Holly, Mich. 48442
Filed May 23, 1967, Ser. No. 640,549
Int. Cl. H02m 7/52, 7/12
U.S. Cl. 321—46                                    12 Claims

ABSTRACT OF THE DISCLOSURE

The invention is applied to a control circuit for supplying either alternating current or direct current from an alternating current source to a load. The control circuit includes a first controlled rectifier and a first diode rectifier connected in inverted parallel relation with each other and connected to one side of the source, and a second controlled rectifier and a second diode rectifier connected in inverted parallel relation with each other and connected to the other side of the source. The load may be connected to the controlled rectifiers and the diode rectifiers so that either alternating current or direct current is supplied to the load. Zener diodes connected across the source provide a point of reference potential. The improvement invention of this application is in the combination with the foregoing elements of the control circuit of an impedance network common to both controlled rectifiers and connected to one side only of the source for supplying firing voltage to the controlled rectifiers, the impedance network including charge storage means such as a capacitor for sustaining the firing voltage between half-cycles of the voltage supplied to the impedance network from the source.

Background of the invention

The invention of this application is an improvement over the subject matter of my copending application Ser. No. 640,551 filed on May 23, 1967.

In the art of controlling alternating current and sinusoidal direct current in circuit loads, the opposing half-cycle waveforms due to this loading may become unbalanced, or lose their proper continuity, or otherwise become distorted when they are controlled by solid state components. This loss of symmetry or other distortion of the output waveform is due to unbalanced signal circuitry, and the reaction of solid state components to the load when power is applied to the load. There has been a need for a simple control circuit which would accomplish symmetrical control of alternating current waveforms and which would not distort the output waveforms. It would also be desirable to have a symmetrical control circuit which could switch current on and off in a load, and which could supply either alternating current or direct current to the load.

I have proposed a control circuit which meets these requirements, the control circuit being described and claimed in the above-identified copending application. The circuit includes symmetrically connected controlled rectifiers and diode rectifiers as outlined above in the abstract of the disclosure and connected to a load so that either alternating current or direct current is supplied to the load. In the specific circuit illustrated in that application, firing voltage is supplied to the controlled rectifiers from the source of alternating current through two impedance networks which are connected respectively between opposite sides of the source and the control portions of the controlled rectifiers. The controlled rectifiers are normally on, and a switching network is provided for blocking the firing voltage to turn the controlled rectifiers off. For some applications, it would be desirable to have the controlled rectifiers normally off, and supply firing voltage to the controlled rectifiers upon actuation of a switching means.

Summary of the invention

The present application proposes to combine with the basic control circuit a single impedance network which feeds firing voltage to both of the controlled rectifiers, and which can be activated and deactivated by simple switching means. The common impedance network may be connected to only one side of the load, and firing voltage is sustained in the impedance network by means of a capacitor which discharges through the impedance network between half-cycles of the voltage supplied from the source.

Accordingly, it is an object of the present invention to provide in combination with a control circuit having symmetrical controlled rectifier portions, a single impedance network for supplying firing voltage to the controlled rectifier.

Another object of the invention is to provide a control circuit as described in the last preceding paragraph in which the impedance network for supplying firing voltage to the controlled rectifiers is connected to only one side of a source of alternating current.

Another object of the invention is to provide a symmetrical control circuit utilizing controlled rectifiers in which the controlled rectifiers are fired by supply voltage conducted through a single impedance network common to the controlled rectifiers, and in which firing voltage is sustained by a capacitor.

A further object of the invention is to provide switching means for controlling firing voltage in the impedance network to switch the controlled rectifiers on and off.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
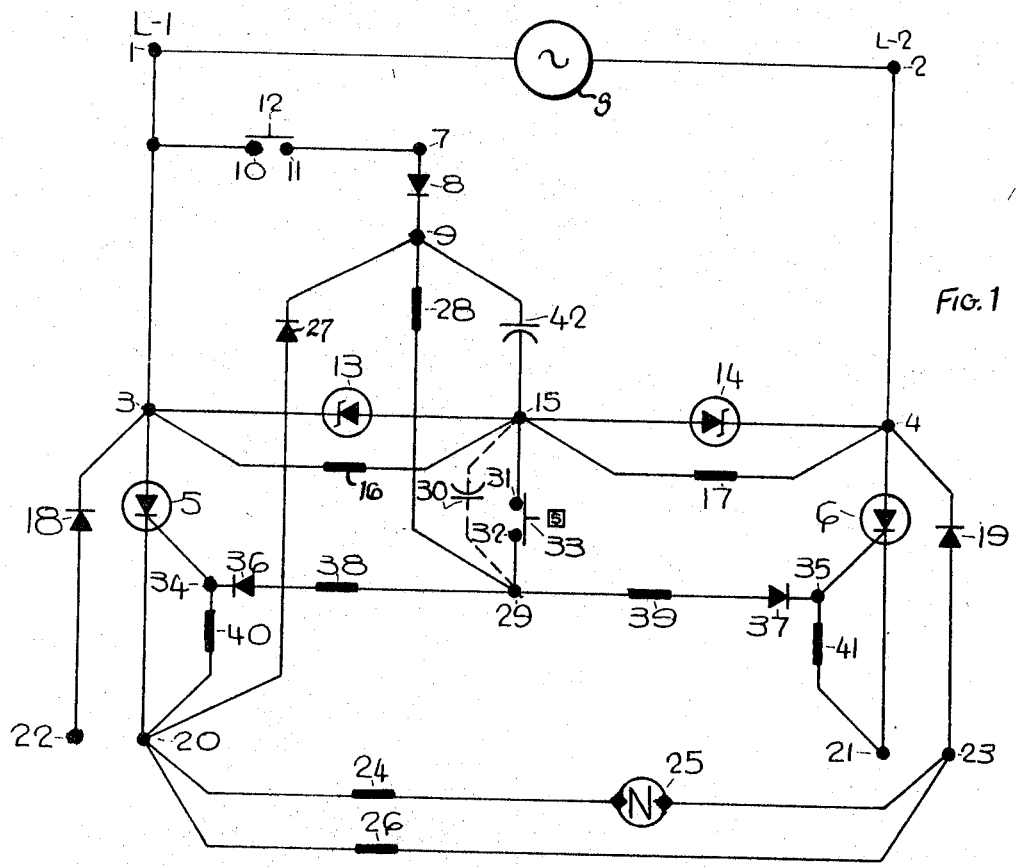
FIGURE 1 is a schematic diagram of a control circuit in accordance with one embodiment of the invention.

As shown on the drawings:

Referring first to FIGURE 1, numerals 1 and 2 are the terminals of an alternating current source S from which alternating current is supplied to the control circuit of the invention. Numeral 3 is a junction electrically common with the anode of a silicon controlled rectifier 5, and numeral 4 is a junction which is electrically common with the anode of another silicon controlled rectifier 6. The anodes, or input portions, of the silicon controlled rectifiers 5 and 6 are connected respectively to the opposite sides of the alternating current source S.

A diode rectifier 18 is connected in inverted parallel relation with silicon controlled rectifier 5, and another diode rectifier 19 is connected in inverted parallel relation with silicon controlled rectifier 6. The cathode of diode rectifier 18 is connected to the anode junction 3, and thus is connected to one side of source S, and the cathode of diode rectifier 19 is connected to the anode junction 4, and thus is connected to the opposite side of alternating source S. The cathode terminals 20 and 21 of silicon controlled rectifiers 5 and 6 respectively, and the anode terminals 22 and 23 of diode rectifiers 18 and 19 respectively are to be connected either to an alternating current load 47 in the manner illustrated in FIGURE 2 or to a direct current load 48 in the manner illustrated in FIGURE 3.

Figure 2:
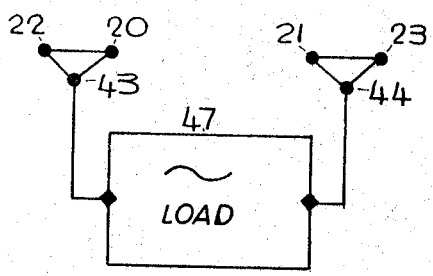
FIGURE 2 shows a load and terminal connection for connecting the load in the control circuit so that alternating current is applied to the load.

Referring first to FIGURE 2, terminals 22 and 20 are connected together and to a terminal 43 on one side of alternating current load 47, and terminals 21 and 23 are connected together and to a terminal 44 on the other side of load 47. Thus, when silicon controlled rectifier 5 is conducting, alternating current is supplied from source S through controlled rectifier 5, terminals 20 and 43, load 47, terminals 44 and 23, and diode rectifier 19 back to the other side of source S. When silicon controlled rectifier 6 is conducting, current is supplied from source S through silicon controlled rectifier 6, terminals 21 and 44, load 47, terminals 43 and 22, and diode rectifier 18 back to the other side of source S. The silicon controlled rectifiers 5 and 6 conduct in alternation as will be explained further, and thus, alternating current is supplied through the load 47 when the output terminals 20, 21, 22 and 23 are connected as shown in FIGURE 2.

Figure 3:
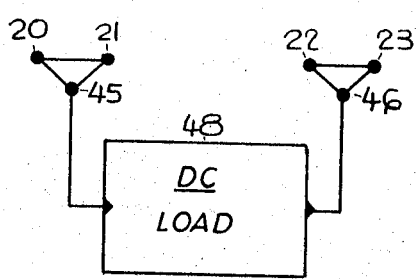
FIGURE 3 shows a direct current load and terminal connections for connecting the load in the control circuit so that direct current is supplied to the load.

In FIGURE 3, it may be seen that the cathode terminals 20 and 21 for silicon controlled rectifiers 5 and 6 are connected together and to a terminal 45 on one side of a DC load 48, and anode terminals 22 and 23 for diode rectifiers 18 and 19 are connected together and to a terminal 46 on the other side of DC load 48. When silicon controlled rectifier 5 is conducting, current is supplied from source S through silicon controlled rectifier 5, terminals 20 and 45, DC load 48, terminals 46 and 23, and diode rectifier 19 back to the other side of the source S. When silicon controlled rectifier 6 is conducting, current is supplied from source S through silicon controlled rectifier 6, terminals 21 and 45, through load 48 in the same direction as the previous current flows, through terminals 46 and 22, and diode rectifier 18 back to the other side of the signal source S. Thus, FIGURE 3 shows connections for supplying sinusoidal direct current through a load 48.

Zener diodes 13 and 14 are connected back-to-back between the anode junctions 3 and 4 in lines L–1 and L–2. The junction 15 between Zener diodes 13 and 14 is a point of zero potential. Zener diodes 13 is shunted by a resistor 16, and Zener diode 14 is shunted by a resistor 17 as shown. In addition to establishing the point 15 of zero potential, Zener diodes 13 and 14 serve to conduct spikes or other overvoltage which may appear on the lines L–1 and L–2 from one side of the line to the other side of the line. This occurs when the spike or overvoltage exceeds the Zener voltage of the Zener diode which opposes such overvoltage.

The present invention utilizes a single impedance network for supplying firing voltage to the two silicon controlled rectifiers 5 and 6. The impedance network includes three resistors 28, 38 and 39. These resistors have a common junction at 29. Resistor 28 is connected to line L–1 through a diode rectifier 8 and a switch composed of fixed contacts 10 and 11 and a movable contact 12. Numerals 7 and 9 are the anode and cathode terminals respectively of diode rectifier 8. The latter diode rectifier serves to rectify current flowing through the impedance network so that only direct current flows therein. Resistor 28 is connected at one end to cathode terminal 9 and at the other end to common junction 29. Resistor 38 is connected at one end to common junction 29 and at the other end to the anode of a diode rectifier 36 which has its cathode connected to the gate terminal 34 of controlled rectifier 5. A resistor 40 is connected between the gate terminal 34 and the cathode terminal 20 of controlled rectifier 5 and serves to adjust the sensitivity of the controlled rectifier to firing voltage. Resistor 39 is connected at one end to common junction 29 and is connected at its other end to the anode of a diode rectifier 37 which has its cathode connected to the gate terminal 35 of silicon controlled rectifier 6. A resistor 41 is connected from gate terminal 35 to the cathode terminal 21 of silicon controlled rectifier 6 and serves to adjust the sensitivity of controlled rectifier 6 to firing voltage.

When switch 12 is closed, positive direct current is supplied through the impedance network including resistors 28, 38 and 39 to the gates 34 and 35 of the silicon controlled rectifiers 5 and 6. The voltage appearing at junction 9 is applied to a capacitor 42 connected between junction 9 and the point 15 of reference potential. Thus, the capacitor 42 will be charged and will sustain the firing voltage between the half-cycles which are supplied to the impedance network from the source. Consequently, silicon controlled rectifier 5 will fire when its anode voltage goes positive relative to the voltage appearing on line L–2, and silicon controlled rectifier 6 will fire when its anode voltage goes positive relative to the voltage appearing on line L–1. Thus, the two silicon controlled rectifiers 5 and 6 fire in alternation.

As an alternative to capacitor 42, the latter capacitor may be omitted and a capacitor 30 may be connected between junction 29 and point 15 of reference potential, the latter connections being shown by dashed lines. Capacitor 30 will also serve to sustain the firing voltage in the impedance network between half-cycles of the current supplied to the impedance network from the source S.

A diode rectifier 27 is connected between cathode terminal 20 of silicon controlled rectifier 5 and the cathode terminal 9 of diode rectifier 8. This rectifier 27 serves to hold the controlled rectifiers 5 and 6 on after the switch 12 is opened. It may be seen that when switch 12 is opened, current will flow through diode rectifier 27 to the resistor 28, and will flow through resistors 28, 38 and 39 to the gates of the controlled rectifiers 5 and 6.

If the diode rectifier 27 were not provided, the firing voltage would be interrupted when switch 12 is opened. However, with diode rectifier 27 in circuit as shown, another switch composed of movable contact 33 and fixed contacts 31 and 32 is provided for shutting off controlled rectifiers 5 and 6. Fixed contact 31 is connected to point 15 of reference potential, and fixed contact 32 is connected to the common junction 29. The movable contact 33 is normally open, and when it is closed, the common junction 29 is shorted to point 15 of zero potential, and this diverts the firing voltage from gates 34 and 35 of silicon controlled rectifiers 5 and 6. The switch 33 thus serves to block the firing potential before it reaches the gates of the silicon controlled rectifiers 5 and 6 so that the silicon controlled rectifier which is conducting at the time will be turned off when its anode voltage goes to zero at the end of a half-cycle of the voltage supplied thereto from the source S.

A resistor 24 and a neon lamp 25 are connected in series between the cathode terminal 20 of silicon controlled rectifier 5 and the anode terminal 23 of diode 19. The lamp 25 will thus light in a pulsating manner to indicate that the control circuit is operating. Another resistor 26 is also connected from cathode terminal 20 to anode terminal 23, and this resistor provides a path for current flow even when the control circuit is not connected to one of the loads 47 and 48.

If switch 12 is closed, and if diode 27 is omitted from the circuit, the opening of switch 12 interrupts the supply of power to the impedance network. Capacitor 42 will then discharge, and, ultimately, silicon controlled rectifiers 5 and 6 will turn off. Capacitor 42 discharges through resistor 28 and resistors 38 and 39 to the gates 34 and 35 of the two silicon controlled rectifiers 5 and 6. Assuming that silicon controlled rectifier 6 has positive anode voltage at this time, it will fire, and the discharge current will split through resistor 41 and silicon controlled rectifier 6. Assuming that the circuit is connected as in FIGURE 2, the discharge current flows through terminals 21 and 22, diode 18, and resistor 16 back to junction 15 which is the point of zero potential to which one side of capacitor 42 is connected. Continuing discharge current will flow through resistor 38, diode 36, silicon controlled rectifier 5, terminals 20 and 23, diode 19 and resistor 17 back to junction 15. It may be seen that the resistors 16 and 17 provide by-pass paths around Zener diodes 13 and 14 for returning the discharge current to point 15 of zero potential, and thus are important to the circuit.

It may be seen from the foregoing description that the control circuit with a single impedance network in accordance with the invention is quite straightforward and utilizes relatively few components. The system operates without distorting an alternating current waveform applied thereto, and this is due to its balanced or symmetrical nature. The circuit is reliable in operation, and may be used in a wide variety of applications such as in logic systems or other systems designed to fulfill control functions.

I claim:

1. In a control circuit for supplying controlled current from a source of alternating current to a load, said control circuit comprising first and second controlled rectifier means each having an input portion, and output portion and a control portion, means for connecting said input portion of said first controlled rectifier means to one side of said source, means for connecting the input portion of said second controlled rectifier means to the other side of said source, first and second rectifier means each having an anode and a cathode, means for connecting the cathode of said first rectifier means to said one side of said source, means for connecting the cathode of said second rectifier means to said other side of said source, said first controlled rectifier means and said first rectifier means being in inverted parallel relation and said second controlled rectifier means and said second rectifier means also being in inverted parallel relation, said load being connectable to said controlled rectifier means and to said rectifier means to provide a direct current load or an alternating current load, and means connected between said input portions for establishing a point of reference potential, the combination therewith of an impedance network common to said first and second controlled rectifier means for supplying firing voltage thereto, said impedance network including first impedance means, means for connecting said first impedance means to one side of said source, second impedance means connected between said first impedance means and said control portion of said first controlled rectifier means, third impedance means connected between said first impedance means and said control portion of said second controlled rectifier means, unidirectional conducting means in circuit with at least one of said impedance means so that said impedance network conducts direct current, and charge storage means connected to said point of reference potential and to at least one of said impedance means for sustaining the voltage applied to the control portions of said first and second controlled rectifiers by said impedance network.

2. A control circuit as claimed in claim 1 in which said control circuit includes switching means for controlling current in said impedance network to thereby turn a load current on and off.

3. A control circuit as claimed in claim 2 in which said switching means is in circuit with said first impedance means and is operable to interrupt current through said first impedance means.

4. A control circuit as claimed in claim 3 in which said switching means is connected between said first impedance means and said source, and in which said impedance network further includes a diode rectifier connected between the output portion of one of said controlled rectifier means and said first impedance means for keeping said impedance network activated after activation thereof by closure of said switching means.

5. A control circuit as claimed in claim 2 in which said impedance network has a junction between said first, second and third impedance means, and said switching means is connected between said junction and said point of reference potential for blocking firing voltage from said controlled rectifier means.

6. A control circuit as claimed in claim 2 in which said impedance network has a junction between said first, second and third impedance means, and said switching means includes a first switch connected between said junction and said point of reference potential operable to block firing voltage from said controlled rectifier means, and a second switch connected in series circuit with said first impedance means between said junction and said source and operable to interrupt current through said first impedance means.

7. A control circuit as claimed in claim 6 in which said charge storage means is connected between said point of reference potential and said junction.

8. A control circuit as claimed in claim 6 in which said charge storage means is connected between said point of reference potential and a point between said first impedance means and said source.

9. A control circuit as claimed in claim 1 in which said impedance network has a junction between said first, second and third impedance means, and said charge storage means is connected between said junction and said point of reference potential.

10. A control circuit as claimed in claim 1 in which said charge storage means is connected between said point of reference potential and a point between said first impedance means and said source.

11. A control circuit as claimed in claim 1 in which said first, second and third impedance means each comprises a resistor.

12. The control circuit as claimed in claim 1 in which said means connected between said input portions for establishing a point of reference potential includes a pair of back to back Zener diodes having the point of zero potential between the same, said control circuit further including resistance means bypassing each of said Zener diodes for returning discharge current from said charge storage means to said point of zero potential.

References Cited

UNITED STATES PATENTS

| 3,246,227 | 4/1966  | Strohmeier et al. | 321—45 X  |
| 3,277,362 | 10/1966 | Elliott           | 323—24    |
| 3,287,576 | 11/1966 | Motto             | 307—305 X |
| 3,329,949 | 7/1967  | Colton et al.     | 307—252 X |

JOHN F. COUCH, *Primary Examiner.*

G. GOLDBERG, *Assistant Examiner.*

U.S. Cl. X.R.

307—242, 252, 305; 323—22, 24